United States Patent

Vary et al.

[11] 3,980,894
[45] Sept. 14, 1976

[54] FLOW TUBES FOR PRODUCING ELECTRIC ENERGY

[76] Inventors: Philip Vary, c/o George Spector, 3615 Woolworth Bldg., 233 Broadway; George Spector, 3615 Woolworth Bldg., 233 Broadway, both of, New York, N.Y. 10007

[22] Filed: July 2, 1974

[21] Appl. No.: 485,166

[52] U.S. Cl. ............................................. 290/54
[51] Int. Cl.² ........................................ H02P 9/04
[58] Field of Search ............... 290/52, 42, 43, 53, 290/54, 1

[56] References Cited
UNITED STATES PATENTS

| | | | |
|---|---|---|---|
| 1,123,491 | 1/1915 | Corbin | 290/54 |
| 1,485,186 | 2/1924 | Harza | 290/52 |
| 2,436,683 | 2/1948 | Wood | 290/54 X |
| 2,634,375 | 4/1953 | Guimbal | 290/52 |
| 2,782,321 | 2/1957 | Fischer | 290/52 X |
| 2,929,937 | 3/1960 | Kruger | 290/52 |

*Primary Examiner*—Robert S. Macon

[57] ABSTRACT

An apparatus for producing electrical energy from unused, wasted, running rivers, ocean tides, and the like without creating any air pollution or harming the environment; the apparatus consisting of large tubes sunken below the water so that the water can flow through, and turbine or impeller blades inside the tubes being turned by the water movement, the impellers driving electric generators which are connected by electric cables to power plants on shore from where the electrical power is distributed for consumption.

2 Claims, 16 Drawing Figures

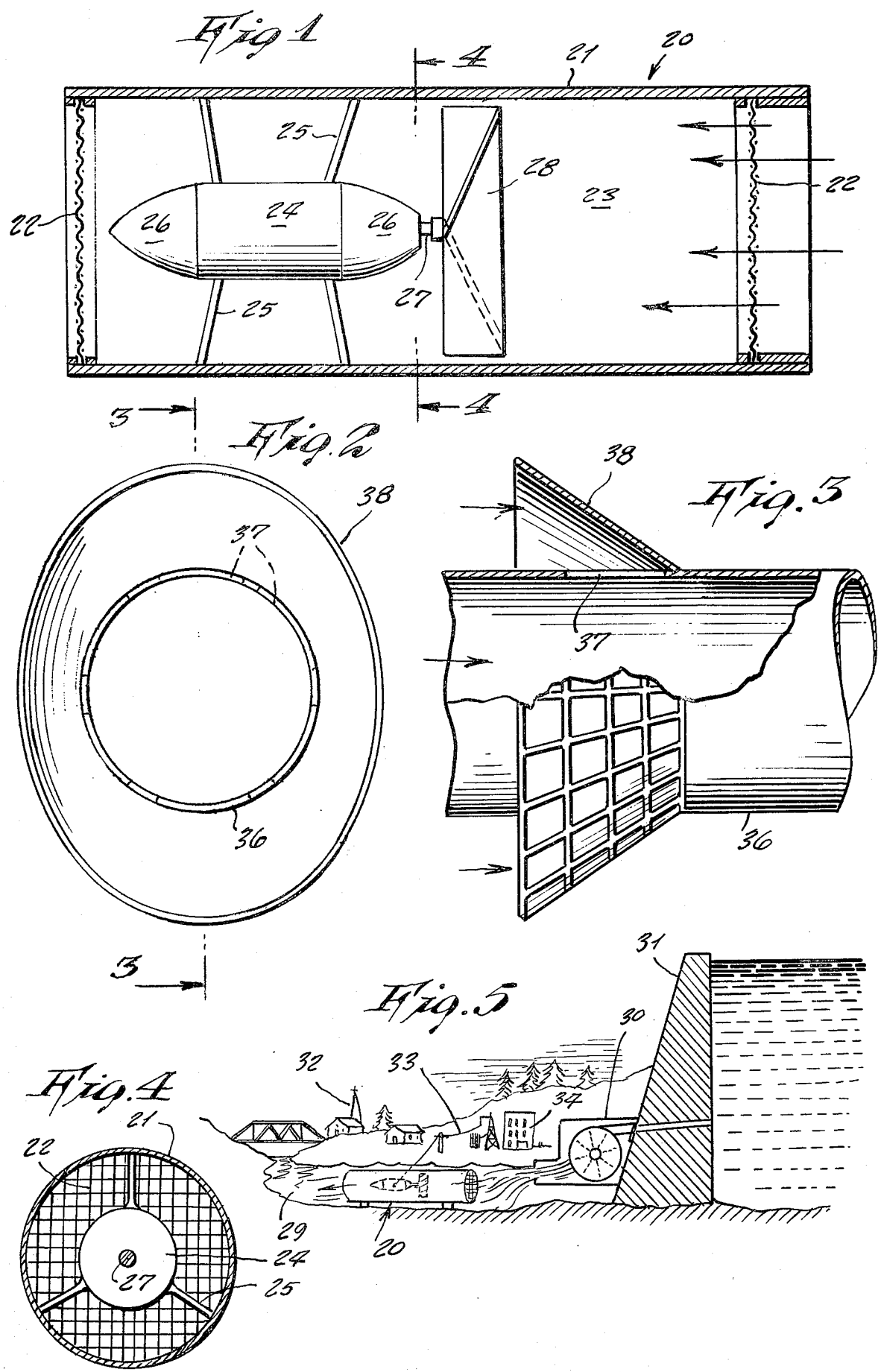

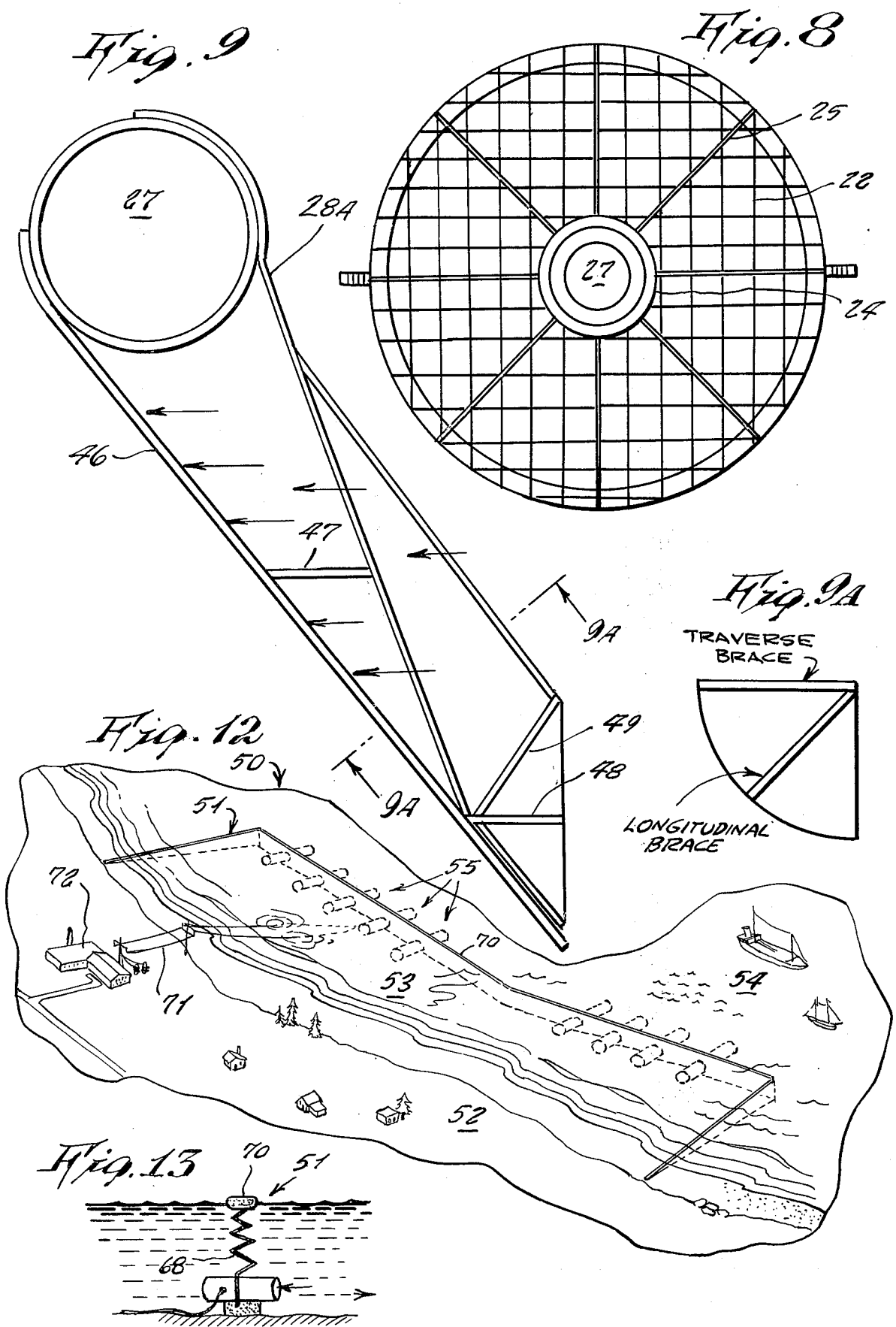

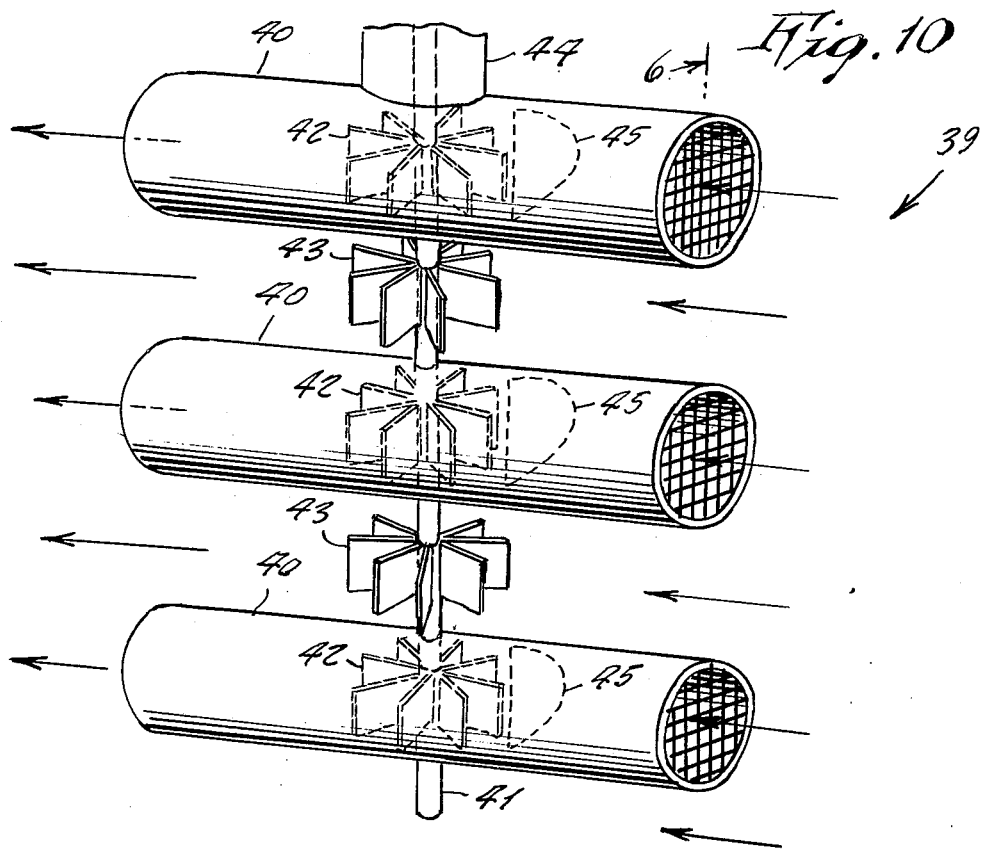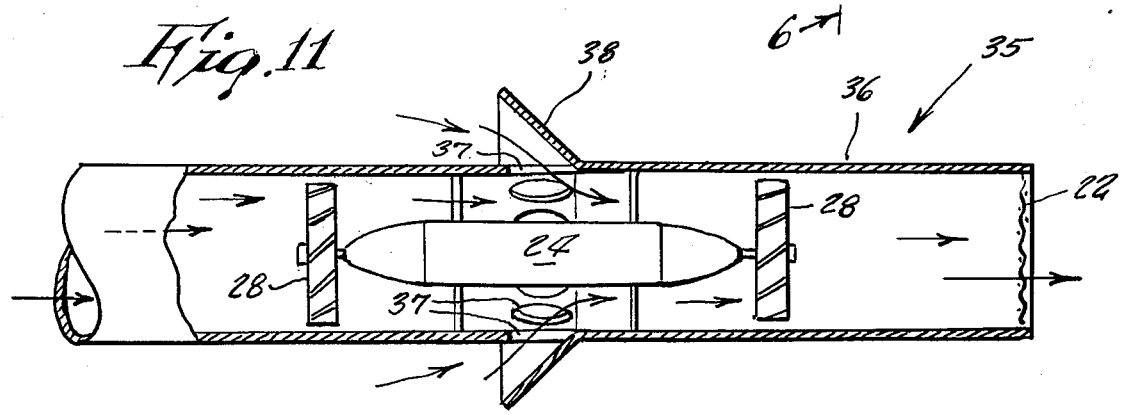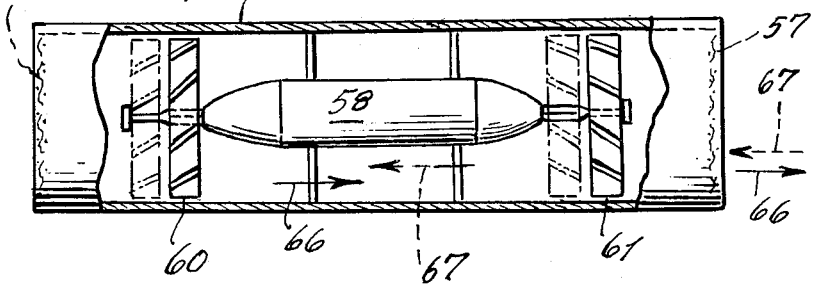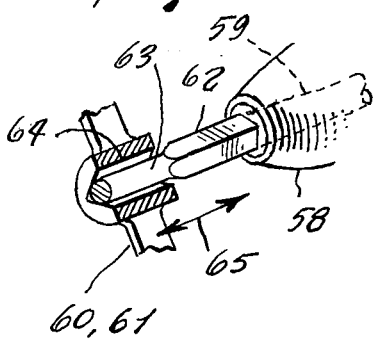

FLOW TUBES FOR PRODUCING ELECTRIC ENERGY

This invention relates generally to power plants.

A principal object of the present invention is to provide an electricity generating power plant which does not cause any air pollution nor which in any manner harms the ecology.

Still another object is to provide an electricity generating power plant which is entirely submerged below a water level so that additionally it does not despoil the landscape view and permits it to remain rural and natural.

Still a further object is to provide an electricity generating power plant which does not use up any resources such as fossil fuels, but which is powered by the natural flow of waters moving down a river, or an ocean tide moving in and out, so that it is free quite completely and continues endlessly.

Still another object is to provide an electricity generating power plant which by being set up underwater in rivers and seas eliminates the many problems associated with the installation of a power plant on land where acquisition of grounds, zoning and numerous other matters are attendant to the establishment thereof.

Still a further object is to provide an electricity generating power plant that can be made on a gigantic scale, the power plant consisting of large numbers of flow tubes that can extend for hundreds of miles along rivers, or for thousands of miles of coastal shores, so that the power derived would be adequate for powering entire municipalities such as large cities, and possibly a major part of a nation.

Other objects are to provide a flow tube for producing electric energy which is simple in design, inexpensive to manufacture, rugged in construction, easy to use and efficient in operation.

These and other objects will be readily evident upon a study of the following specification and the accompanying drawing wherein:

FIG. 1 is a side cross sectional view of the tube.

FIG. 2 is a flared entry for a tube scoop.

FIG. 3 is a side view thereof, partly in cross section.

FIG. 4 is a cross section on line 4—4 of FIG. 1.

FIG. 5 is a diagram showing use of the invention in a river running from a dam.

FIG. 8 is an end view of an impeller blades cage.

FIG. 9 is an end view of an impeller blade and brace structure.

FIG. 9A is a cross sectional view taken on line 9A—9A of FIG. 9.

FIG. 10 is a perspective view of the multiple flow tube arrangement shown in FIG. 6.

FIG. 11 is a side cross sectional view of a modified design of the flow tube shown in FIG. 1.

FIG. 12 is a top perspective or airplane view of the present invention harnessing the ocean tides along a coast, and consisting of a series of flow tubes inserted through a sea wall.

FIG. 13 is an enlarged transverse vertical cross sectional view taken through FIG. 12, and showing the sea wall to be of accordian construction so that the top thereof is always flush with the water surface and does not extend thereabove.

FIG. 14 is a side cross sectional view of one of the flow tubes of the structure shown in FIG. 12, and which operates when the tide moves both in or out.

FIG. 15 is an enlarged detail of structure shown in FIG. 14.

Figure 6:
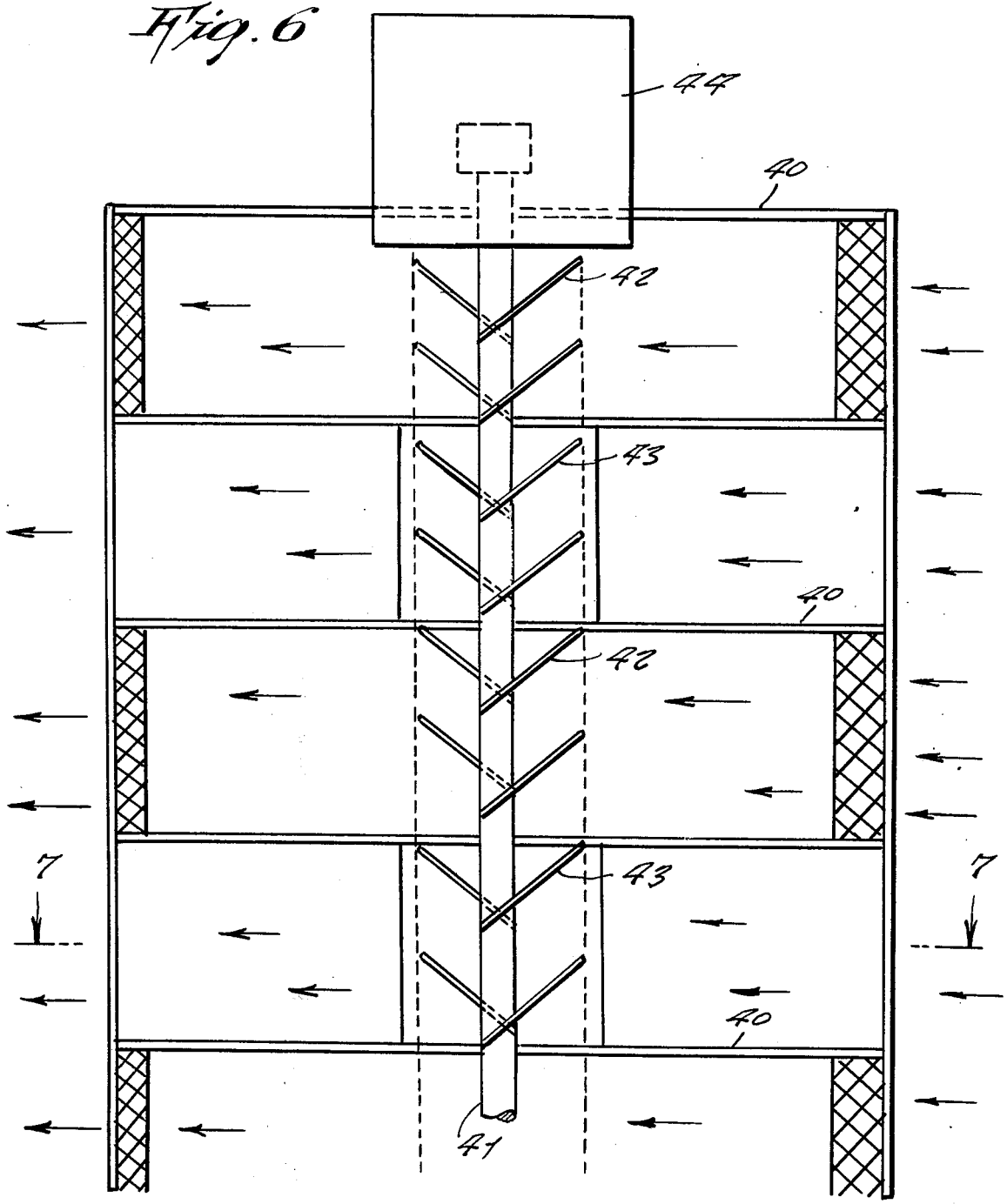
FIG. 6 is a view of a multiple flow tube arrangement shown in cross section, as viewed on line 6—6 of FIG. 10.

Referring now to the drawings in detail, and more particularly to FIGS. 1, 4 and 5, thereof at this time, the reference numeral 20 represents a flow tube according to the present invention wherein there is a large cylindrical tube member 21 made of a durable material so that it does not corrode when submerged for long time underwater. A re-inforced screen 22 closes each opposite end thereof so to prevent entry of logs, tree branches or other large objects that may be present in a flowing water.

Within the interior 23 of the tube 21, there is an electric generator 24 that is supported along the tube central axis by means of radial extending braces 25. Both opposite ends of the generator case are streamlined as shown at 26 so water flows smoothly past it. A shaft 27 protruding from an end of the generator case has an impeller blade unit 28 securely affixed thereupon.

In operative use, as shown in FIG. 5, the flow tube 20 is installed underwater within a running river 29. The river may not be coming from a hydro-electric plant 30 below a waterfall or at a dam 31. In either case, the river is free running. The underwater installation of the flow tube does not spoil the beautiful appearance of the river as it flows through a countryside or a town 32. The only suggestion of the installation comprises electric power lines 33 extending from the flow tube generator to an electric power station 34 on shore and from which the power is distributed to the town. Power lines 33, in fact, may be underground so to be hidden.

Thus an improved electric power plant is provided that has numerous advantages over existing methods of power production.

In FIGS. 2, 3 and 11 a modified design of flow tube 35 is shown which incorporates all the elements of the flow tube 20 except that it includes two impeller blade units 28 each one of which is at opposite ends of the generator 24, and both of which turn in a same direction as they are on the same shaft thereof.

In this form of the invention, the cylindrical tube member 36 is interrupted by a circular row of openings 37 so that water moving around the outer side of the tube strikes a conical baffle 38 and forces the water inwardly through openings 37 so that this water is moved against only one of the impeller blade units as is evident in FIG. 11, while only the water that originally entered the tube end is moved against both impeller blade units. In this construction, the openings 37 are accordingly located between the two impellers for this purpose. It is understood that in this form of the invention several separate generators may be installed axially apart inside the tube.

Figure 7:
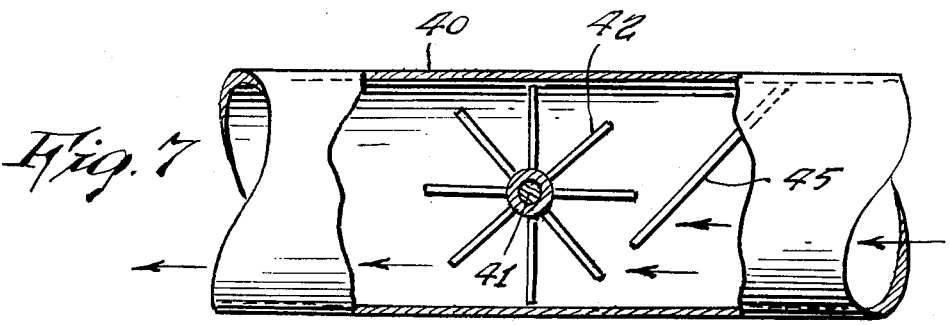
FIG. 7 is a cross sectional view thereof taken on line 7—7 of FIG. 6.

In FIGS. 6, 7 and 10 another modified design 39 of the invention incorporates a row of flow tubes 40 in parallel, spaced apart relation. Instead of each flow tube having its own generator, a transverse shaft 41 extends cross ways through all the flow tubes, and an impeller blade unit 42 secured on the shaft is positioned inside each flow tube while another impeller blade unit 43 also secured on the shaft is positioned between each tube. The shaft extends into a generator 44 located on one end of this multiple flow tube arrangement. This arrangement allows each tube to rest tilted at its own independent angle where a river bed is variously contoured across. It should be noted that a baffle 45 inside each tube serves to direct the water flow toward one side of each impeller so to make it turn.

In FIGS. 9 and 9A the construction is shown for the impeller blade 28A and the braces therefor. This includes a main or primary brace 46, secondary brace 47, and a cross brace 48 near a terminal end of the impeller blade. The main brace extends from the V-bottom 49 of the impeller blade to the generator shaft. The impeller blades are bolted to the generator shaft for reason of easy removal for repairs or replacement.

Referring now to FIGS. 12 through 15, a modified design 50 of the invention is shown that is constructed particularly for installation along a sea or ocean coast so to harness the ebb and flow of tides.

This consists of a sea wall 51 constructed along a coast 52 so to enclose a portion of the sea water in an enclosed area 53 so that as the tide rises or falls on the open sea area 54 there is according a difference in water levels between areas 53 and 54. A series of flow tubes 55 are installed through the sea wall 51 so that the water can accordingly flow in and out of the enclosed area 53. Thus this movement of great volumes of water through the flow tubes results in an enormous amount of energy that can be harnessed.

Each flow tube 55 consists of cylindrical tube 56 having re-inforced screen 57 at each end, and containing central generator 58 having main shaft 59 extending therethrough. A clockwise rotating impeller 60 is mounted on one end of the shaft, and a counterclockwise rotating impeller 61 is mounted on the shaft other end. Each shaft end includes a cross sectionally round portion 62 and a terminal cross sectionally round portion 63. Each impeller, 60 and 61, has a square (or hex) opening 64 as shown in FIG. 11 through which the shaft end extends, and the impeller is freely slidable along the shaft axis so that selectively the impeller is supported on the portions 62 or 63 as indicated by double headed arrow 65, by sliding from one to the other.

In operative use, accordingly, when, for example, the tide is running in the direction as indicated by the solid arrows 66 of FIG. 14, the impeller 60 at such time is slided by the force of the running water so that it is engaged upon the square portion 62 of the shaft so that it drives the generator shaft 59. Meantime, the same directional water force slides the impeller 61 upon the round portion 63 of the shaft so that it does not drive the shaft, but freely spins. Later when the tide reverses, so to run in the direction indicated by dotted arrows 67, the water force pushes the impeller 61 so it engages on the square portion 62 of the shaft so to drive the generator, while the same water force slides the impeller 60 upon the round portion 63 of the shaft so that it now freely spins and no longer drives the generator. Thus by use of a clockwise and counterclockwise operating impellers and a change of tide directions, a constantly same shaft rotation is obtained, automatically, with need of personal attention.

The sea wall 51 is constructed to be vertically collapsible by means of horizontal corrugations 68 so that an upper end thereof secured to a float 69 never projects unsightly above the water surface, and is thus not exposed to high winds or breaking sea waves, so that it cannot get damaged. Thus the wall height automatically adjusts to the tide water level. A lower edge of the wall is secured in a long concrete foundation 70 as shown thus sealing off the areas 53 and 54 from each other.

Power cables 71 from the float tube generators extend to power stations 72 upon the shore.

Thus a modified design of the invention is provided.

While various changes may be made in the detail construction, it is understood that such changes will be within the spirit and scope of the present invention as is defined by the appended claims.

What is claimed is as follows:

1. An electricity generating power plant, comprising a tube submerged in water in combination with an electric generator mounted therein having a rotatable shaft in said tube in combination with an impeller mounted on said shaft whereby water flow through said tube provides an impelling force against said impeller in further combination with circumferentially spaced ports through said tube upstream of said impeller, further including a conical baffle surrounding said ports and flaring externally from said tube in an upstream direction whereby water flow external to said tube is directed into said ports and against the impeller to provide an impelling force, additional to that provided by said water flow through said tube, including a second impeller mounted on said axle spaced upstream from said first baffle.

2. An electrically generating power plant, comprising a tube submerged in water in combination with an electric generator mounted therein having a rotatable shaft in said tube in combination with an impeller mounted on said shaft whereby water flow through said tube provides an impelling force against said impeller is in further combination with circumferentially spaced ports through said tube upstream of said impeller, further including a conical baffle surrounding said ports and flaring externally from said tube in an upstream direction whereby water flow external to said tube is directed into said ports against the tube is directed into said ports against the impeller to provide an impelling force additional to that provided by said water flow through said tube, wherein the impeller axially slidable between two portions of said shaft, wherein one of said portions permits rotation of said impeller relative to said shaft.

* * * * *